US011807055B2

(12) United States Patent
Todoroki (10) Patent No.: US 11,807,055 B2
(45) Date of Patent: Nov. 7, 2023

(54) HEAVY DUTY TIRE

(71) Applicant: SUMITOMO RUBBER INDUSTRIES, LTD., Kobe (JP)

(72) Inventor: Daisuke Todoroki, Hyogo (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/592,674

(22) Filed: Feb. 4, 2022

(65) Prior Publication Data
US 2022/0250415 A1 Aug. 11, 2022

(30) Foreign Application Priority Data

Feb. 5, 2021 (JP) ................................. 2021-017034

(51) Int. Cl.
*B60C 9/18* (2006.01)
*B60C 11/01* (2006.01)
(Continued)

(52) U.S. Cl.
CPC .............. *B60C 9/2204* (2013.01); *B60C 9/28* (2013.01); *B60C 11/042* (2013.01); *B60C 11/13* (2013.01); *B60C 2009/2012* (2013.01); *B60C 2009/2219* (2013.01); *B60C 2011/0341* (2013.01); *B60C 2011/0348* (2013.01); *B60C 2011/0353* (2013.01); *B60C 2011/0355* (2013.01); *B60C 2011/0397* (2013.01); *B60C 2200/06* (2013.01)

(58) Field of Classification Search
CPC . B60C 9/22; B60C 9/2204; B60C 2009/2219; B60C 2011/0348; B60C 2011/393; B60C 2011/0397; B60C 2011/013
See application file for complete search history.

(56) References Cited

U.S. PATENT DOCUMENTS

2007/0113946 A1* 5/2007 Manno ..................... B60C 9/185
152/533
2014/0326380 A1* 11/2014 Kotoku ................. B60C 9/0007
152/209.1
(Continued)

FOREIGN PATENT DOCUMENTS

JP 11048716 A * 2/1999
JP 2012162135 A * 8/2012
WO WO 2014/010091 A1 1/2014

OTHER PUBLICATIONS

Machine Translation: JP-2012162135-A, Kato H, (Year: 2023).*
Machine Translation: JP-11048716-A, Kukimoto T, (Year: 2023).*

*Primary Examiner* — Kendra Ly (74) *Attorney, Agent, or Firm* — Birch, Stewart, Kolasch & Birch, LLP (57) ABSTRACT

A tire 2 has a nominal aspect ratio of 65% or less. The tire 2 includes a tread 4 and a band 34. The band 34 includes a full band 42 and a pair of edge bands 44 located outward of ends of the full band 42 in a radial direction. A narrow groove 56 is formed on a shoulder land portion 54s of the tread 4. The narrow groove 56 includes an inner groove wall 62u and an outer groove wall 62s. The inner groove wall 62u includes an inner recess portion 64 recessed inward in the axial direction, on a groove bottom side. The outer groove wall 62s includes an outer recess portion 66 recessed outward in the axial direction, on the groove bottom side.

14 Claims, 4 Drawing Sheets

(51) Int. Cl.
*B60C 11/13* (2006.01)
*B60C 11/03* (2006.01)
*B60C 9/22* (2006.01)
*B60C 9/28* (2006.01)
*B60C 11/04* (2006.01)
*B60C 9/20* (2006.01)

(56) References Cited

U.S. PATENT DOCUMENTS

2015/0298505 A1   10/2015  Iga
2021/0039444 A1*  2/2021   Taniguchi ........... B60C 11/1323

* cited by examiner

HEAVY DUTY TIRE

TECHNICAL FIELD

The present invention relates to heavy duty tires.

This application claims priority on Japanese Patent Application No. 2021-17034 filed on Feb. 5, 2021, the entire content of which is incorporated herein by reference.

BACKGROUND ART

For heavy duty tires, the application of a technology for suppressing radial growth of a tire has been considered in order to prevent occurrence of uneven wear. For example, in the tire disclosed in PATENT LITERATURE 1 below, a band including a band cord extending substantially in a circumferential direction is adopted in order to suppress radial growth of the tire.

CITATION LIST

Patent Literature

PATENT LITERATURE 1: International Publication No. WO2014/010091

SUMMARY OF THE INVENTION

Technical Problem

It is effective to adopt such a band in order to prevent occurrence of uneven wear. However, in a low-flatness heavy duty tire having a nominal aspect ratio of 65% or less, uneven wear is still more likely to occur as compared to a high-flatness tire.

As a technology for improving uneven wear resistance, there is a technology in which a narrow groove is formed in a shoulder land portion and a sacrificial land portion is provided at an end portion of the shoulder land portion. However, in a low-flatness tire, strain is likely to be concentrated on the grove bottom of the narrow groove, and there is a high risk of damage such as cracks and tears occurring at the grove bottom, so that the application of this technique to such a low-flatness tire has been postponed.

The present invention has been made in view of such circumstances, and an object of the present invention is to provide a heavy duty tire that can achieve improvement of uneven wear resistance.

Solution to Problem

A heavy duty tire according to an aspect of the present invention has a nominal aspect ratio of 65% or less. The tire includes a tread that comes into contact with a road surface and a band that is located inward of the tread in a radial direction and that includes a spirally wound band cord. At least three circumferential grooves are formed on the tread, whereby at least four land portions are formed in the tread. Among the at least three circumferential grooves, a circumferential groove located on each outer side in an axial direction is a shoulder circumferential groove. A land portion located outward of the shoulder circumferential groove in the axial direction is a shoulder land portion. The band includes a full band having ends opposed to each other across an equator plane, and a pair of edge bands located outward of the ends of the full band in the radial direction. A narrow groove is formed on the shoulder land portion so as to extend in a circumferential direction. The narrow groove includes an inner groove wall that is located on an equator plane side and that connects a groove opening and a groove bottom of the narrow groove, and an outer groove wall that is located outward of the inner groove wall in the axial direction and that connects the groove opening and the groove bottom of the narrow groove. The inner groove wall includes an inner recess portion that is recessed inward in the axial direction, on the groove bottom side. The outer groove wall includes an outer recess portion that is recessed outward in the axial direction, on the groove bottom side.

Preferably, in the heavy duty tire, a height in the radial direction of the inner recess portion is lower than a height in the radial direction of the outer recess portion.

Preferably, in the heavy duty tire, a contour of the inner recess portion in a meridional cross-section of the tire includes an inner curved portion represented by a circular arc having a center on an outer side of the inner recess portion in the axial direction. The circular arc has a radius of not less than 1.5 mm.

Preferably, in the heavy duty tire, a ratio of a groove depth of the narrow groove to a groove depth of the shoulder circumferential groove is not greater than 150%.

Preferably, in the heavy duty tire, of the narrow groove, a portion including the inner recess portion and the outer recess portion is an expansion portion. A ratio of a groove width at the groove opening of the narrow groove to a maximum width of the expansion portion is not greater than 1.0.

More preferably, in the heavy duty tire, the narrow groove includes a tubular portion that connects the groove opening and the expansion portion and that extends straight. The groove bottom is located outward of a center line of the tubular portion in the axial direction.

Preferably, in the heavy duty tire, each end of the full band is located outward of the shoulder circumferential groove in the axial direction.

Preferably, in the heavy duty tire, a ratio of a distance in the axial direction from the shoulder circumferential groove to the end of the full band, to a width in the axial direction of the shoulder land portion, is not less than 10% and not greater than 50%.

Preferably, in the heavy duty tire, a distance in the axial direction from the end of the full band to an inner end of the edge band is not less than 10 mm.

Preferably, in the heavy duty tire, a ratio of a width of the tread to a cross-sectional width of the tire is not less than 0.60 and not greater than 0.90.

Advantageous Effects of the Invention

According to the present invention, a heavy duty tire that can achieve improvement of uneven wear resistance is obtained.

DETAILED DESCRIPTION

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state. The dimensions and angles of each component in a meridional cross-section of the tire, which cannot be measured in a state where the tire is fitted on the normal rim, are measured in a cross-section of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims. A rim in the present disclosure means a normal rim unless otherwise specified.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, the "nominal aspect ratio" is the "nominal aspect ratio" included in "tyre designation" specified in JIS D4202 "Automobile tyres—Designation and dimensions".

Figure 1:
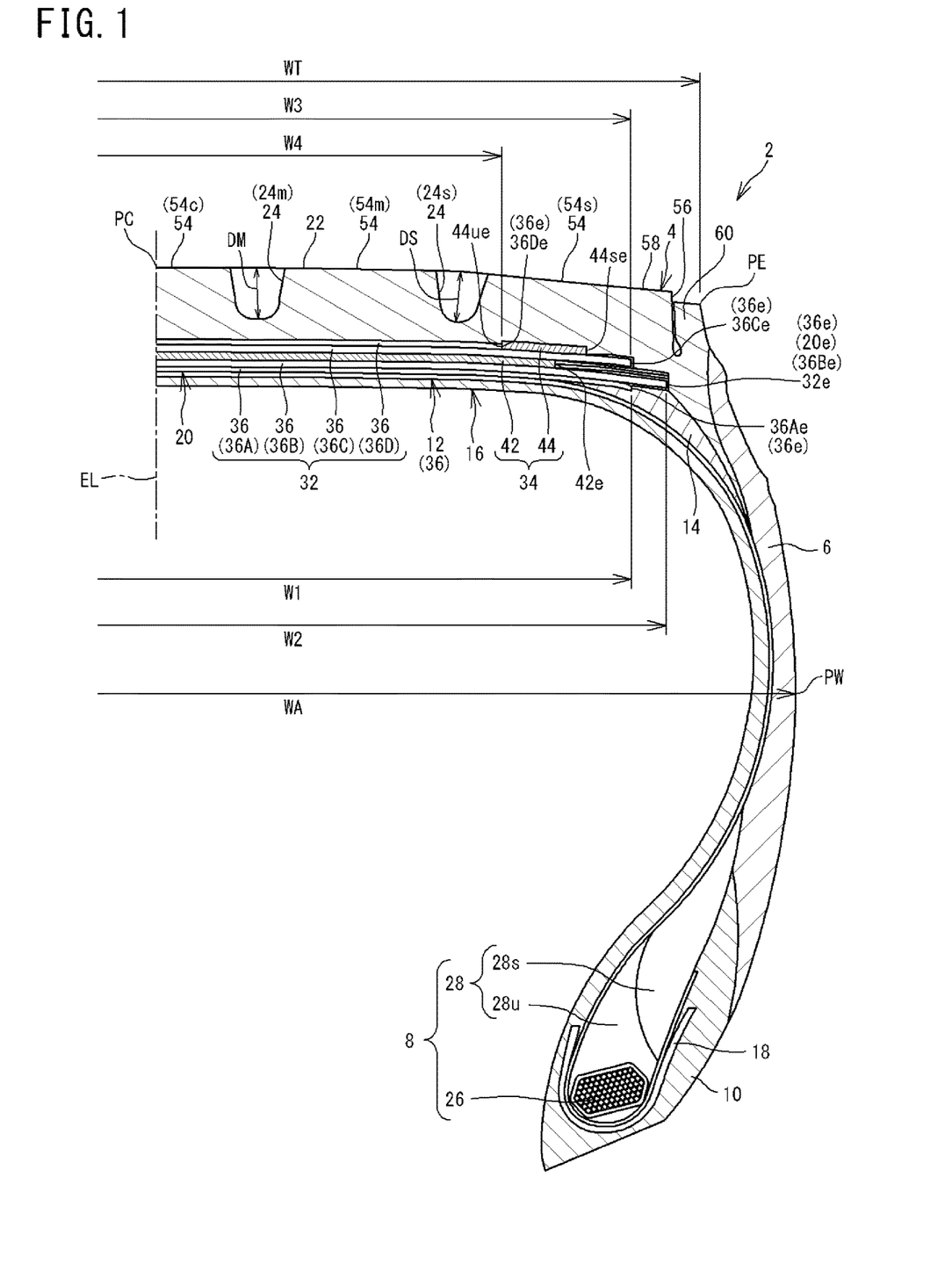
FIG. 1 is a cross-sectional view showing a part of a heavy duty tire according to an embodiment of the present invention.

FIG. 1 shows a part of a heavy duty tire 2 (hereinafter, also referred to simply as "tire 2") according to an embodiment of the present invention. The tire 2 is mounted to a vehicle such as a truck and a bus. The nominal aspect ratio of the tire 2 is not greater than 65%. In other words, the tire 2 has a nominal aspect ratio of 65% or less. The tire 2 is a low-flatness tire.

FIG. 1 shows a part of a cross-section (hereinafter, also referred to as meridional cross-section) of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. An alternate long and short dash line EL represents the equator plane of the tire 2.

In FIG. 1, a position indicated by reference sign PW is an outer end in the axial direction of the tire 2. In the case where decorations such as patterns and letters are present on the outer surface of the tire 2, the outer end PW is specified on the basis of a virtual outer surface obtained on the assumption that the decorations are not present.

In FIG. 1, a length indicated by reference sign WA is the maximum width of the tire 2, that is, the cross-sectional width (see JATMA or the like) of the tire 2. The cross-sectional width WA of the tire 2 is the distance in the axial direction from one outer end PW to the other outer end PW. Each outer end PW is a position (hereinafter, maximum width position) at which the tire 2 has the maximum width.

The tire 2 includes a tread 4, a pair of sidewalls 6, a pair of beads 8, a pair of chafers 10, a carcass 12, a pair of cushion layers 14, an inner liner 16, a pair of steel fillers 18, and a reinforcing layer 20.

The tread 4 comes into contact with a road surface at an outer surface thereof. The outer surface of the tread 4 is a tread surface 22. In FIG. 1, reference sign PC represents the point of intersection of the tread surface 22 and the equator plane EL. The point of intersection PC corresponds to the equator of the tire 2.

In FIG. 1, reference sign PE represents an end of the tread surface 22. A length indicated by reference sign WT is the width of the tread 4. The width WT of the tread 4 is the distance in the axial direction from one end PE of the tread surface 22 to the other end PE of the tread surface 22. When the ends PE of the tread surface 22 cannot be identified from the appearance, the position on the tread surface 22 corresponding to each outer end in the axial direction of a ground-contact surface obtained when the normal load is applied as a vertical load to the tire 2 in the normal state with a camber angle of the tire 2 being set to 0° and the tire 2 is brought into contact with a road surface that is a flat surface, is used as each end PE of the tread surface 22.

The tread 4 is formed from a crosslinked rubber. The tread 4 includes a cap layer and a base layer which are not shown. The cap layer is formed from a crosslinked rubber for which wear resistance and grip performance are taken into consideration, and forms the tread surface 22. The base layer is formed from a crosslinked rubber that has low heat generation properties, and is located inward of the cap layer.

In the tire 2, at least three circumferential grooves 24 are formed on the tread 4. On the tread 4 of the tire 2 shown in FIG. 1, four circumferential grooves 24 are formed. These circumferential grooves 24 are aligned in the axial direction and continuously extend in the circumferential direction.

Among the four circumferential grooves 24 formed on the tread 4, the circumferential groove 24 located on each outer side in the axial direction is a shoulder circumferential groove 24s. The circumferential groove 24 located inward of the shoulder circumferential groove 24s in the axial direction is a middle circumferential groove 24m. In the tire 2, the four circumferential grooves 24 include a pair of the middle circumferential grooves 24m and a pair of the shoulder circumferential grooves 24s.

In the tire 2, from the viewpoint of contribution to drainage performance and traction performance, the groove width of each middle circumferential groove 24m is preferably not less than 2% and not greater than 10% of the width WT of the tread 4. The groove width of each shoulder circumferential groove 24s is preferably not less than 1% and not greater than 7% of the width WT of the tread 4.

In FIG. 1, a length indicated by reference sign DM is the groove depth of the middle circumferential groove 24m. A length indicated by reference sign DS is the groove depth of the shoulder circumferential groove 24s. From the viewpoint of contribution to drainage performance and traction performance, the groove depth DM of the middle circumferential groove 24m is preferably not less than 10 mm and not greater than 25 mm. The groove depth DS of the shoulder circumferential groove 24s is preferably not less than 10 mm and not greater than 25 mm.

Each sidewall 6 is connected to an end of the tread 4. The sidewall 6 is located inward of the tread 4 in the radial direction. The sidewall 6 is formed from a crosslinked rubber. The sidewall 6 protects the carcass 12.

Each bead 8 is located radially inward of the sidewall 6. The bead 8 includes a core 26 and an apex 28.

The core 26 extends in the circumferential direction. The core 26 includes a wound wire made of steel. The core 26 has a substantially hexagonal cross-sectional shape.

The apex 28 is located radially outward of the core 26. The apex 28 includes an inner apex 28u and an outer apex 28s. The inner apex 28u extends radially outward from the core 26. The outer apex 28s is located radially outward of the inner apex 28u. The inner apex 28u is formed from a hard crosslinked rubber. The outer apex 28s is formed from a crosslinked rubber that is more flexible than the inner apex 28u.

Each chafer 10 is located axially outward of the bead 8. The chafer 10 is located radially inward of the sidewall 6. The chafer 10 comes into contact with a rim (not shown). The chafer 10 is formed from a crosslinked rubber for which wear resistance is taken into consideration.

The carcass 12 is located inward of the tread 4, each sidewall 6, and each chafer 10. The carcass 12 includes at least one carcass ply 30. The carcass 12 of the tire 2 is composed of one carcass ply 30. The carcass ply 30 is turned up around each core 26 from the inner side toward the outer side in the axial direction.

The carcass ply 30 includes a large number of carcass cords aligned with each other, which are not shown. These carcass cords are covered with a topping rubber. Each carcass cord intersects the equator plane EL. An angle of the carcass cords relative to the equator plane EL is not less than 70° and not greater than 90°. The carcass 12 has a radial structure. Steel cords are used as the carcass cords.

Each cushion layer 14 is located between the reinforcing layer 20 and the carcass 12 at an end 20e of the reinforcing layer 20. The cushion layer 14 is formed from a flexible crosslinked rubber.

The inner liner 16 is located inward of the carcass 12. The inner liner 16 forms an inner surface of the tire 2. The inner liner 16 is formed from a crosslinked rubber that has a low gas permeability coefficient. The inner liner 16 maintains the internal pressure of the tire 2.

Each steel filler 18 is located at a bead 8 portion. The steel filler 18 is turned up around the core 26 from the inner side toward the outer side in the axial direction along the carcass ply 30.

The steel filler 18 includes a large number of filler cords aligned with each other, which are not shown. In the steel filler 18, the filler cords are covered with a topping rubber. Steel cords are used as the filler cords.

The reinforcing layer 20 is located inward of the tread 4 in the radial direction. The reinforcing layer 20 is located between the carcass 12 and the tread 4. The reinforcing layer 20 includes a belt 32 and a band 34.

Figure 2:
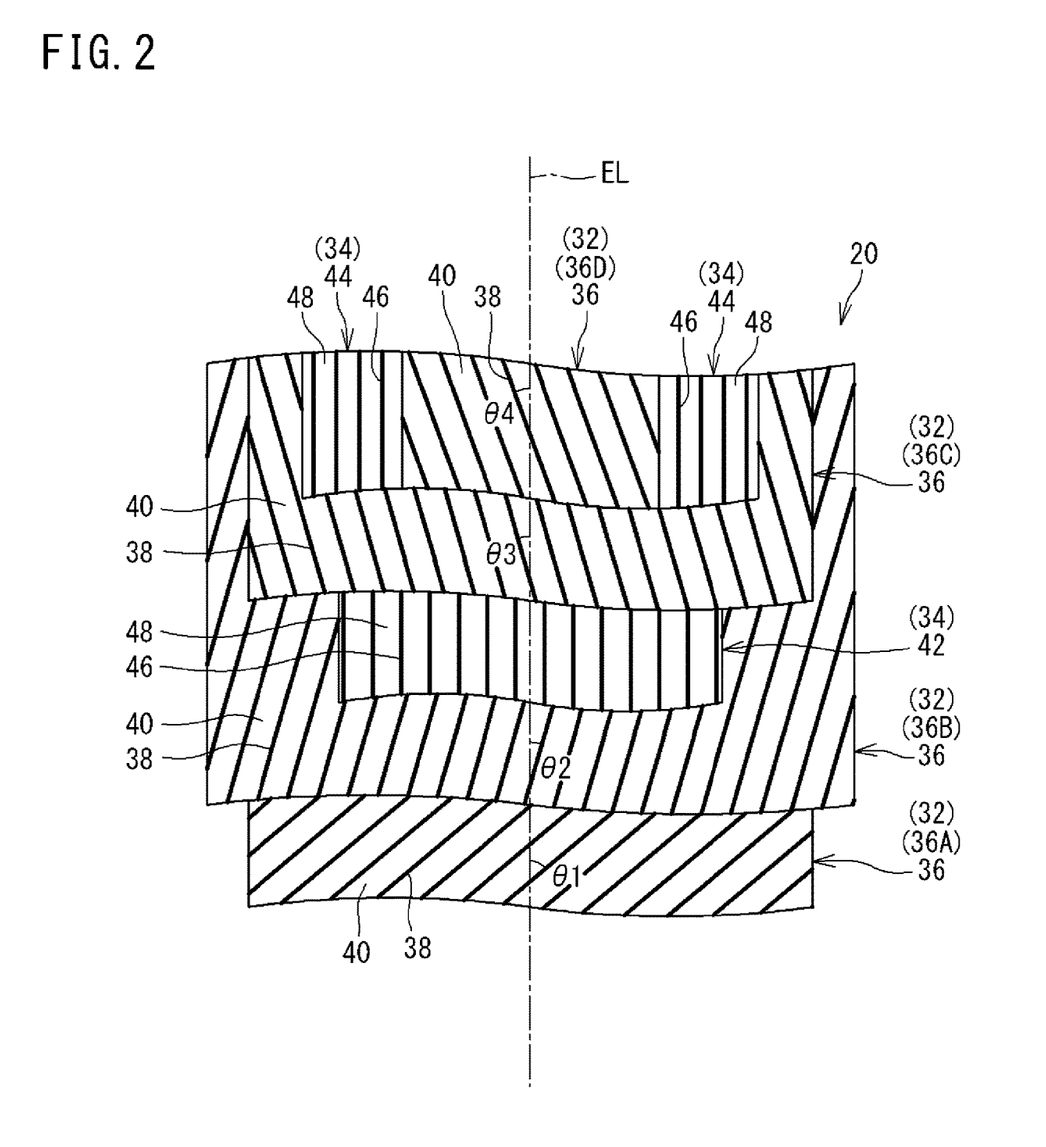
FIG. 2 is a schematic diagram illustrating the configuration of a reinforcing layer.

FIG. 2 shows the configuration of the reinforcing layer 20. In FIG. 2, the right-left direction is the axial direction of the tire 2, and the up-down direction is the circumferential direction of the tire 2. The direction perpendicular to the surface of the sheet of FIG. 2 is the radial direction of the tire 2. The front side of the sheet of FIG. 2 is the outer side in the radial direction, and the back side of the sheet is the inner side in the radial direction.

The belt 32 includes a plurality of belt plies 36 aligned in the radial direction. Each belt ply 36 is disposed such that both ends thereof are opposed to each other across the equator plane EL. The belt 32 of the tire 2 includes four belt plies 36. The four belt plies 36 include a first belt ply 36A located on the inner side in the radial direction, a second belt ply 36B located outward of the first belt ply 36A in the radial direction, a third belt ply 36C located outward of the second belt ply 36B in the radial direction, and a fourth belt ply 36D located outward of the third belt ply 36C in the radial direction.

As shown in FIG. 1, an end 36Ae of the first belt ply 36A is located outward of the shoulder circumferential groove 24s in the axial direction. An end 36Be of the second belt ply 36B is located outward of the shoulder circumferential groove 24s in the axial direction. An end 36Ce of the third belt ply 36C is located outward of the shoulder circumferential groove 24s in the axial direction. An end 36De of the fourth belt ply 36D is located outward of the shoulder circumferential groove 24s in the axial direction.

An end 32e of the belt 32 of the tire 2 is represented as an end of the belt ply 36 having the largest width in the axial direction among the plurality of belt plies 36 included in the belt 32. Although described later, in the tire 2, the second belt ply 36B has the largest width in the axial direction. The end 32e of the belt 32 of the tire 2 is represented as the end 36Be of the second belt ply 36B. In the tire 2, the end 32e of the belt 32 is also the end 20e of the reinforcing layer 20.

In FIG. 1, a length indicated by reference sign W1 is the width in the axial direction of the first belt ply 36A. A length indicated by reference sign W2 is the width in the axial direction of the second belt ply 36B. A length indicated by reference sign W3 is the width in the axial direction of the third belt ply 36C. A length indicated by reference sign W4 is the width in the axial direction of the fourth belt ply 36D. The width in the axial direction of each belt ply 36 is the distance in the axial direction from one end 36e of the belt ply 36 to the other end 36e of the belt ply 36.

In the tire 2, the second belt ply 36B has the largest width W2 in the axial direction, and the fourth belt ply 36D has the smallest width W4 in the axial direction. The first belt ply 36A has the width W1 in the axial direction equal to the width W3 in the axial direction of the third belt ply 36C. The width W1 in the axial direction of the first belt ply 36A may be larger than the width W3 in the axial direction of the third belt ply 36C.

In the tire 2, from the viewpoint of ensuring the stiffness of a portion including the tread 4 (hereinafter, also referred to as tread portion), the ratio (W1/WT) of the width W1 in the axial direction of the first belt ply 36A to the width WT of the tread 4 is preferably not less than 0.80 and preferably not greater than 0.90. The ratio (W2/WT) of the width W2 in the axial direction of the second belt ply 36B to the width WT of the tread 4 is preferably not less than 0.85 and preferably not greater than 0.95. The ratio (W3/WT) of the width W3 in the axial direction of the third belt ply 36C to the width WT of the tread 4 is preferably not less than 0.80 and preferably not greater than 0.90. The ratio (W4/WT) of the width W4 in the axial direction of the fourth belt ply 36D to the width WT of the tread 4 is preferably not less than 0.55 and preferably not greater than 0.65.

As shown in FIG. 2, each belt ply 36 included in the belt 32 includes a large number of belt cords 38 aligned with each other. In FIG. 2, for convenience of description, the belt cords 38 are represented by solid lines, but the belt cords 38 are covered with a topping rubber 40. The belt cords 38 of the tire 2 are steel cords.

In the tire 2, the density of the belt cords 38 in each belt ply 36 is not less than 15 ends/5 cm and not greater than 30 ends/5 cm. The density of the belt cords 38 is represented as the number of cross-sections of the belt cords 38 included per 5 cm width of the belt ply 36 in a cross-section of the belt ply 36 along a plane perpendicular to the direction in which the belt cords 38 extend.

The belt cords 38 in each belt ply 36 are tilted relative to the circumferential direction. The direction in which the belt cords 38 included in the first belt ply 36A are tilted (hereinafter, the tilt direction of first belt cords) is the same as the direction in which the belt cords 38 included in the second belt ply 36B are tilted (hereinafter, the tilt direction of second belt cords). The tilt direction of the second belt cords is opposite to the direction in which the belt cords 38 included in the third belt ply 36C are tilted (hereinafter, the tilt direction of third belt cords). The tilt direction of the third belt cords is the same as the direction in which the belt cords 38 included in the fourth belt ply 36D are tilted (hereinafter, the tilt direction of fourth belt cords). The tilt direction of the first belt cords may be opposite to the tilt direction of the second belt cords, and the tilt direction of the fourth belt cords may be opposite to the tilt direction of the third belt cords. In the tire 2, from the viewpoint of obtaining a ground-contact surface whose shape change is suppressed, the tilt direction of the second belt cords is preferably opposite to the tilt direction of the third belt cords.

In FIG. 2, an angle $\theta 1$ is a tilt angle (hereinafter, first tilt angle $\theta 1$) of the belt cords 38 included in the first belt ply 36A relative to the equator plane EL. An angle $\theta 2$ is a tilt angle (hereinafter, second tilt angle $\theta 2$) of the belt cords 38 included in the second belt ply 36B relative to the equator plane EL. An angle $\theta 3$ is a tilt angle (hereinafter, third tilt angle $\theta 3$) of the belt cords 38 included in the third belt ply 36C relative to the equator plane EL. An angle $\theta 4$ is a tilt angle (hereinafter, fourth tilt angle $\theta 4$) of the belt cords 38 included in the fourth belt ply 36D relative to the equator plane EL.

In the tire 2, each of the first tilt angle $\theta 1$, the second tilt angle $\theta 2$, the third tilt angle $\theta 3$, and the fourth tilt angle $\theta 4$ is preferably not less than 10° and preferably not greater than 60°. From the viewpoint of effectively restraining movement of the tire 2 and ensuring shape stability of the ground-contact surface, the first tilt angle $\theta 1$ is preferably not less than 40° and preferably not greater than 60°. The second tilt angle $\theta 2$ is preferably not less than 10° and preferably not greater than 20°. The third tilt angle $\theta 3$ is preferably not less than 10° and preferably not greater than 20°. The fourth tilt angle $\theta 4$ is preferably not less than 10° and preferably not greater than 60°.

The band 34 includes a full band 42 and a pair of edge bands 44. As shown in FIG. 1, the full band 42 has ends 42e opposed to each other across the equator plane EL. The pair of edge bands 44 are disposed so as to be spaced apart from each other in the axial direction with the equator plane EL therebetween. In the tire 2, the fourth belt ply 36D, which forms a part of the belt 32, is located between the right and left edge bands 44.

In the tire 2, each edge band 44 is located between the tread 4 and the full band 42. The edge band 44 is located outward of the end 42e of the full band 42 in the radial direction. In the axial direction, an inner end 44ue of the edge band 44 is located inward of the end 42e of the full band 42. In the axial direction, an outer end 44se of the edge band 44 is located outward of the end 42e of the full band 42. The position of the outer end 44se of the edge band 44 may coincide with the position of the end 42e of the full band 42 in the axial direction. The edge band 44 overlaps the end 42e of the full band 42 in the radial direction.

As shown in FIG. 2, the full band 42 and the pair of edge bands 44 included in the band 34 each include a spirally wound band cord 46. In FIG. 2, for the convenience of description, the band cords 46 are represented by solid lines, but each band cord 46 is covered with a topping rubber 48.

In the tire 2, the band cords 46 are steel cords or cords formed from an organic fiber (hereinafter, organic fiber cords). In the case where organic fiber cords are used as the band cords 46, examples of the organic fiber include nylon fibers, polyester fibers, rayon fibers, and aramid fibers. In the tire 2, as the band cord 46 of the full band 42 and the band cords 46 of the edge bands 44, the same cord may be used, or different cords may be used. The band cords 46 used for the full band 42 and the edge bands 44 are determined according to the specifications of the tire 2.

As described above, the full band 42 includes the spirally wound band cord 46. The full band 42 has a jointless structure. In the full band 42, an angle of the band cord 46 relative to the circumferential direction is preferably not greater than 5° and more preferably not greater than 2°. The band cord 46 of the full band 42 extends substantially in the circumferential direction.

The density of the band cord 46 in the full band 42 is not less than 20 ends/5 cm and not greater than 35 ends/5 cm. The density of the band cord 46 in the full band 42 is represented as the number of cross-sections of the band cord 46 included per 5 cm width of the full band 42 in a cross-section of the full band 42 included in the meridional cross-section.

As described above, each edge band 44 includes the spirally wound band cord 46. The edge band 44 has a jointless structure. In the edge band 44, an angle of the band cord 46 relative to the circumferential direction is preferably not greater than 5° and more preferably not greater than 2°. The band cord 46 of the edge band 44 extends substantially in the circumferential direction.

The density of the band cord 46 in the edge band 44 is not less than 20 ends/5 cm and not greater than 35 ends/5 cm. The density of the band cord 46 in the edge band 44 is represented as the number of cross-sections of the band cord 46 included per 5 cm width of the edge band 44 in a cross-section of the edge band 44 included in the meridional cross-section.

Figure 3:
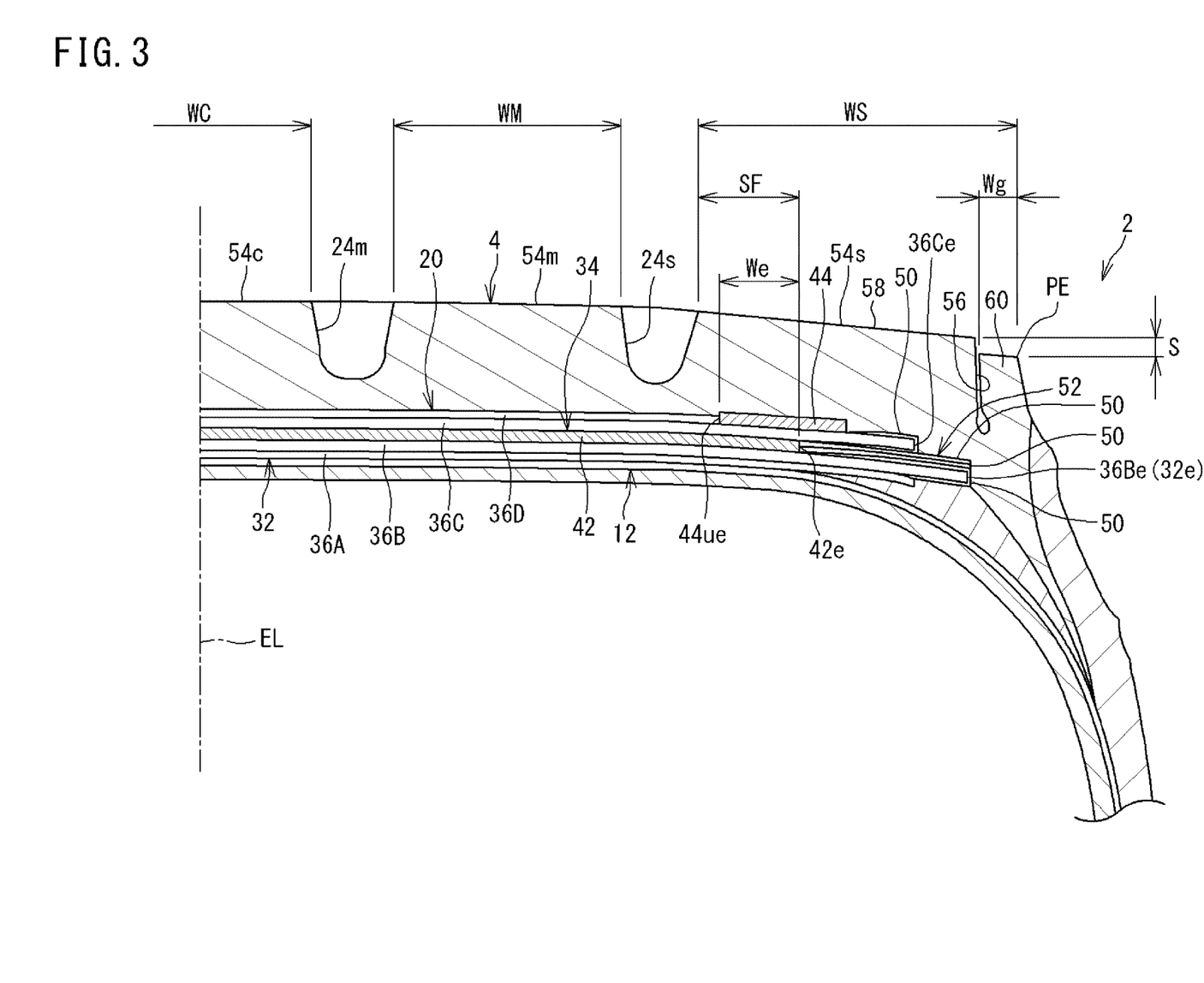
FIG. 3 is an enlarged cross-sectional view showing a part of the tire in FIG. 1.

FIG. 3 shows a part of the cross-section of the tire 2 shown in FIG. 1. In FIG. 3, the right-left direction is the axial direction of the tire 2, and the up-down direction is the radial direction of the tire 2. The direction perpendicular to the surface of the sheet of FIG. 3 is the circumferential direction of the tire 2.

In the tire 2, each of the end 36Be of the second belt ply 36B and the end 36Ce of the third belt ply 36C is covered with a rubber layer 50. Two rubber layers 50 are further disposed between the end 36Be of the second belt ply 36B and the end 36Ce of the third belt ply 36C, each of which is covered with the rubber layer 50. In the tire 2, an edge member 52 including four rubber layers 50 in total is formed between the end 36Be of the second belt ply 36B and the end 36Ce of the third belt ply 36C. The edge member 52 is formed from a crosslinked rubber. The edge member 52 contributes to maintaining the interval between the end 36Be of the second belt ply 36B and the end 36Ce of the third belt ply 36C. In the tire 2, a change of the positional relationship between the end 36Be of the second belt ply 36B and the end 36Ce of the third belt ply 36C due to running is suppressed. The edge member 52 is a part of the reinforcing layer 20. The reinforcing layer 20 of the tire 2 includes a pair of edge members 52 in addition to the belt 32 and the band 34.

As described above, at least three circumferential grooves 24 are formed on the tread 4. Accordingly, at least four land portions 54 are formed in the tread 4. As shown in FIG. 1 and FIG. 3, in the tire 2, five land portions 54 are formed by forming four circumferential grooves 24 on the tread 4. In the present disclosure, the boundary between the outer surface of each land portion 54 and each circumferential groove 24 is represented as an end of the land portion 54. The end of the land portion 54 is also the groove opening of the circumferential groove 24.

Among the five land portions 54 formed in the tread 4, the land portion 54 located on each outer side in the axial direction is a shoulder land portion 54s. The shoulder land portion 54s is located outward of the shoulder circumferential groove 24s in the axial direction and includes the end PE of the tread surface 22. In FIG. 3, a length indicated by reference sign WS is the width in the axial direction of the shoulder land portion 54s. The width WS in the axial direction is the distance in the axial direction from the inner end of the shoulder land portion 54s to the outer end of the shoulder land portion 54s (in other words, the end PE of the tread surface 22).

The land portion 54 located inward of the shoulder land portion 54s in the axial direction is a middle land portion 54m. The shoulder circumferential groove 24s is present between the middle land portion 54m and the shoulder land portion 54s. In FIG. 3, a length indicated by reference sign WM is the width in the axial direction of the middle land portion 54m. The width WM in the axial direction is the distance in the axial direction from the inner end of the middle land portion 54m to the outer end of the middle land portion 54m.

The land portion 54 located inward of the middle land portion 54m in the axial direction is a center land portion 54c. The middle circumferential groove 24m is present between the center land portion 54c and the middle land portion 54m. In the tire 2, the center land portion 54c is located on the equator plane EL. In FIG. 3, a length indicated by reference sign WC is the width in the axial direction of the center land portion 54c. The width WC in the axial direction is the distance in the axial direction from one end of the center land portion 54c to the other end of the center land portion 54c which is not shown.

In the tire 2, the five land portions 54 include the center land portion 54c, a pair of the middle land portions 54m, and a pair of the shoulder land portions 54s.

In the tire 2, the width WC in the axial direction of the center land portion 54c is not less than 10% and not greater than 18% of the width WT of the tread 4. The width WM in the axial direction of each middle land portion 54m is not less than 10% and not greater than 18% of the width WT of the tread 4. The width WS in the axial direction of each shoulder land portion 54s is not less than 15% and not greater than 25% of the width WT of the tread 4.

For example, as shown in FIG. 3, in the tire 2, a narrow groove 56 is formed on the shoulder land portion 54s so as to extend in the circumferential direction. In the tire 2, the narrow groove 56 continuously extends in the circumferential direction. The narrow groove 56 may be formed so as to intermittently extend in the circumferential direction.

In the tire 2, by forming the narrow groove 56 on each shoulder land portion 54s, a land portion body 58 and a narrow land portion 60 are formed in the shoulder land portion 54s. The land portion body 58 is located inward of the narrow groove 56 in the axial direction and includes the inner end of the shoulder land portion 54s. The narrow land portion 60 is located outward of the narrow groove 56 in the axial direction and includes the outer end of the shoulder land portion 54s, that is, the end PE of the tread surface 22.

As shown in FIG. 3, the outer surface of the narrow land portion 60 is located inward of the outer surface of the land portion body 58 in the radial direction. In the tire 2, a step is formed in the shoulder land portion 54s by the land portion body 58 and the narrow land portion 60. A length indicated by reference sign S is the height of the step between the outer surface of the land portion body 58 and the outer surface of the narrow land portion 60. The height S of the step is represented as the distance in the radial direction from the outer end of the land portion body 58 to the inner end of the narrow land portion 60. The height S of the step is preferably not less than 1 mm and not greater than 4 mm.

In FIG. 3, a length indicated by reference sign Wg is the width in the axial direction of the narrow land portion 60. The width Wg in the axial direction is the distance in the axial direction from the inner end of the narrow land portion 60 to the outer end of the narrow land portion 60 (that is, the end PE of the tread surface 22). In the tire 2, the ratio (Wg/WS) of the width Wg in the axial direction of the narrow land portion 60 to the width WS in the axial direction of the shoulder land portion 54s is preferably not less than 3% and not greater than 8%.

Figure 4:
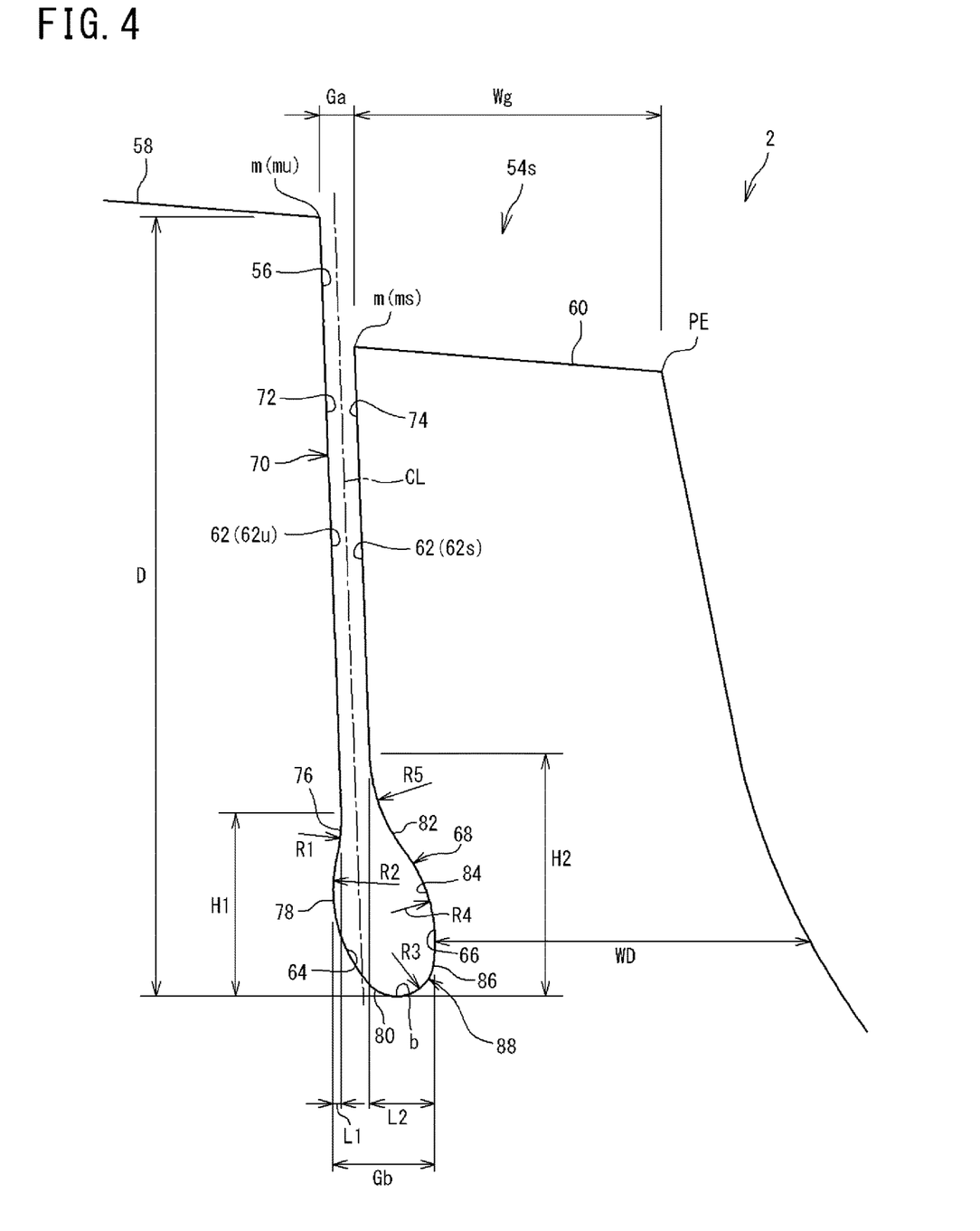
FIG. 4 is an enlarged cross-sectional view showing a part of the tire in FIG. 3.

FIG. 4 shows a part of the shoulder land portion 54s. In FIG. 4, the right-left direction is the axial direction of the tire 2, and the up-down direction is the radial direction of the tire 2. The direction perpendicular to the surface of the sheet of FIG. 4 is the circumferential direction of the tire 2.

The narrow groove 56 includes a pair of groove walls 62 each connecting a groove opening m and a groove bottom b thereof. In the tire 2, of the pair of groove walls 62, the groove wall 62 located on the equator plane EL side is an inner groove wall 62u, and the groove wall 62 located outward of the inner groove wall 62u in the axial direction is an outer groove wall 62s. The narrow groove 56 includes the inner groove wall 62u which is located on the equator plane EL side and which connects the groove opening m and the groove bottom b of the narrow groove 56, and the outer groove wall 62s which is located outward of the inner groove wall 62u in the axial direction and which connects the groove opening m and the groove bottom b of the narrow groove 56.

In the tire 2, the groove opening m that is the boundary between the inner groove wall 62u and the outer surface of the land portion body 58 is also referred to as inner groove opening mu. The inner groove opening mu is also the outer end of the land portion body 58. The groove opening m that is the boundary between the outer groove wall 62s and the outer surface of the narrow land portion 60 is also referred to as outer groove opening ms. The outer groove opening ms is also the inner end of the narrow land portion 60. The boundary between the inner groove wall 62u and the outer groove wall 62s is the groove bottom b.

In the tire 2, the inner groove wall 62u includes an inner recess portion 64 which is recessed inward in the axial direction, on the groove bottom b side. The outer groove wall 62s includes an outer recess portion 66 which is recessed outward in the axial direction, on the groove bottom b side. In the narrow groove 56, a portion including the inner recess portion 64 and the outer recess portion 66 is an expansion portion 68. The expansion portion 68 includes the groove bottom b.

In the narrow groove 56, a portion connecting the groove opening m and the expansion portion 68 is a tubular portion 70. The tubular portion 70 extends straight. The narrow groove 56 includes the expansion portion 68 which includes the groove bottom b, and the tubular portion 70 which connects the groove opening m and the expansion portion 68 and which extends straight.

In the tire 2, of the inner groove wall 62u, a portion forming the tubular portion 70 is referred to as inner smooth portion 72. The inner groove wall 62u includes the inner smooth portion 72 on the groove opening m side and the inner recess portion 64 on the groove bottom b side. Of the outer groove wall 62s, a portion forming the tubular portion 70 is referred to as outer smooth portion 74. The outer groove wall 62s includes the outer smooth portion 74 on the groove opening m side and the outer recess portion 66 on the groove bottom b side.

In the meridional cross-section, the contours of the inner smooth portion 72 and the outer smooth portion 74 are represented by straight lines. The inner smooth portion 72 and the outer smooth portion 74 are parallel to each other. The tubular portion 70 may be formed such that the inner smooth portion 72 and the outer smooth portion 74 are tapered inward in the radial direction.

In the meridional cross-section, the contour of the inner recess portion 64 is represented by using a plurality of circular arcs. The contour of the inner recess portion 64 includes an inner boundary portion 76, an inner curved portion 78, and an inner bottom portion 80 each of which is represented by a circular arc.

The inner boundary portion 76 is located between the inner smooth portion 72 and the inner curved portion 78 in the radial direction. The inner boundary portion 76 is represented by a circular arc having a center (not shown) on the inner side of the inner recess portion 64 in the axial direction. In FIG. 4, a one-sided arrow indicated by reference sign R1 represents the radius of the circular arc that represents the inner boundary portion 76 (hereinafter, also referred to as radius R1 of the inner boundary portion 76).

The inner curved portion 78 is located between the inner boundary portion 76 and the inner bottom portion 80 in the radial direction. The inner curved portion 78 is represented by a circular arc having a center (not shown) on the outer side of the inner recess portion 64 in the axial direction. In FIG. 4, a one-sided arrow indicated by reference sign R2 represents the radius of the circular arc that represents the inner curved portion 78 (hereinafter, also referred to as radius R2 of the inner curved portion 78).

The inner bottom portion 80 is located between the inner curved portion 78 and the groove bottom b in the radial direction. The inner bottom portion 80 is represented by a circular arc having a center (not shown) on the outer side of the inner recess portion 64 in the axial direction. In FIG. 4, a one-sided arrow indicated by reference sign R3 represents the radius of the circular arc that represents the inner bottom portion 80 (hereinafter, also referred to as radius R3 of the inner bottom portion 80).

In the tire 2, the inner boundary portion 76 connects the inner smooth portion 72 and the inner curved portion 78, and the inner curved portion 78 connects the inner boundary portion 76 and the inner bottom portion 80. The inner smooth portion 72 and the inner boundary portion 76 are tangent to each other at the boundary between the inner smooth portion 72 and the inner boundary portion 76. The inner boundary portion 76 and the inner curved portion 78 are tangent to each other at the boundary between the inner boundary portion 76 and the inner curved portion 78. The inner curved portion 78 and the inner bottom portion 80 are tangent to each other at the boundary between the inner curved portion 78 and the inner bottom portion 80.

In the meridional cross-section, the contour of the outer recess portion 66 is represented by using a plurality of circular arcs. The contour of the outer recess portion 66 includes an outer boundary portion 82, an outer curved portion 84, and an outer bottom portion 86 each of which is represented by a circular arc.

The outer boundary portion 82 is located between the outer smooth portion 74 and the outer curved portion 84 in the radial direction. The outer boundary portion 82 is represented by a circular arc having a center (not shown) on the outer side of the outer recess portion 66 in the axial direction. In FIG. 4, a one-sided arrow indicated by reference sign R5 represents the radius of the circular arc that represents the outer boundary portion 82 (hereinafter, also referred to as radius R5 of the outer boundary portion 82).

The outer curved portion 84 is located between the outer boundary portion 82 and the outer bottom portion 86 in the radial direction. The outer curved portion 84 is represented by a circular arc having a center (not shown) on the inner side of the outer recess portion 66 in the axial direction. In FIG. 4, a one-sided arrow indicated by reference sign R4 represents the radius of the circular arc that represents the outer curved portion 84 (hereinafter, also referred to as radius R4 of the outer boundary portion 82).

The outer bottom portion 86 is located between the outer curved portion 84 and the groove bottom b in the radial direction. The outer bottom portion 86 is represented by a circular arc having a center (not shown) on the inner side of the outer recess portion 66 in the axial direction. In the tire 2, the outer bottom portion 86 is represented by a circular arc that is the same as the circular arc that represents the above-described inner bottom portion 80. In FIG. 4, a one-sided arrow indicated by reference sign R3 is also the radius of the circular arc that represents the outer bottom portion 86 (hereinafter, also referred to as radius R3 of the outer bottom portion 86). In the tire 2, of the contour of the expansion portion 68, a portion composed of the outer bottom portion 86 and the inner bottom portion 80 is represented as a bottom portion 88. reference sign R3 indicates the radius of the circular arc that represents the bottom portion 88.

In the tire 2, the outer boundary portion 82 connects the outer smooth portion 74 and the outer curved portion 84, and the outer curved portion 84 connects the outer boundary portion 82 and the outer bottom portion 86. The outer smooth portion 74 and the outer boundary portion 82 are tangent to each other at the boundary between the outer smooth portion 74 and the outer boundary portion 82. The outer boundary portion 82 and the outer curved portion 84 are tangent to each other at the boundary between the outer boundary portion 82 and the outer curved portion 84. The outer curved portion 84 and the outer bottom portion 86 are tangent to each other at the boundary between the outer curved portion 84 and the outer bottom portion 86.

As described above, the full band 42 has the ends 42e opposed to each other across the equator plane EL. The full band 42 extends in the axial direction from the equator plane EL toward each end 42e.

In the tire 2, the full band 42 effectively restrains movement of the tread portion. A change of the shape of the tire 2, for example, a change of the contour (hereinafter, also referred to as case line) of the carcass 12, is suppressed, so that the ground-contact shape of the tire 2 is less likely to change.

Furthermore, in the tire 2, each edge band 44 is located outward of the end 42e of the full band 42 in the radial direction. The edge band 44 holds the end 42e of the full band 42. Fluctuation of the tension of the band cord 46 included in the full band 42 is suppressed, so that a break of the band cord 46 due to the fluctuation of the tension is less likely to occur. The full band 42 of the tire 2 can stably exhibit the function of suppressing a shape change. The edge band 44 is narrower than the full band 42. Therefore, tension fluctuation as in the full band 42 is less likely to occur in the band cord 46 of the edge band 44. A break is less likely to occur in the band cord 46 of the edge band 44.

In the tire 2, the full band 42 and the edge bands 44 suppress a shape change of the tire 2 due to running. The band 34 contributes to improvement of uneven wear resistance.

In the tire 2, the narrow land portion 60 is provided at the end portion of the shoulder land portion 54s. The narrow land portion 60 is also referred to as sacrificial land portion. When the tire 2 stands on a road surface, the narrow land portion 60 comes into contact with the land portion body 58 and supports the land portion body 58. In the tire 2, an excessive increase in ground-contact pressure at the outer end of the shoulder land portion 54s, specifically, the outer end of the land portion body 58, is suppressed. The narrow land portion 60 contributes to improvement of uneven wear resistance.

In the tire 2, the full band 42 and the edge band 44 suppress a shape change of the tire 2 due to running, so that deformation of the land portion body 58 is effectively suppressed in combination with the effect of supporting the land portion body 58 by the narrow land portion 60. The tire 2 achieves good uneven wear resistance.

Furthermore, in the tire 2, the inner recess portion 64 and the outer recess portion 66 are provided on the groove bottom b side of the narrow groove 56. The inner recess portion 64 and the outer recess portion 66 contribute to distribution of strain generated at the groove bottom b. Since concentration of strain on the groove bottom b is suppressed, damage such as cracks and tears is less likely to occur at the groove bottom b of the narrow groove 56. Since the narrow land portion 60 can stably exert its function, good uneven wear resistance lasts over a long period of time in the tire 2. The tire 2 achieves improvement of uneven wear resistance.

In FIG. 4, a length indicated by reference sign D is the groove depth of the narrow groove 56. The groove depth D is the distance in the radial direction from the inner groove opening mu to the groove bottom b, that is, the length in the radial direction of the inner groove wall 62u. A length indicated by reference sign H1 is the height in the radial direction of the inner recess portion 64. The height H1 in the radial direction is the distance in the radial direction from the groove bottom b to the boundary between the inner smooth portion 72 and the inner recess portion 64. A length indicated by reference sign H2 is the height in the radial direction of the outer recess portion 66. The height H2 in the radial direction is the distance in the radial direction from the groove bottom b to the boundary between the outer smooth portion 74 and the outer recess portion 66.

In the tire 2, the height H1 in the radial direction of the inner recess portion 64 is lower than the height H2 in the radial direction of the outer recess portion 66. Accordingly, the land portion body 58 can ensure required stiffness on the outer end side thereof. Since movement of the land portion body 58 is effectively suppressed, damage such as chipping is prevented from occurring in the land portion body 58. Since the height H2 in the radial direction is higher than the height H1 in the radial direction, when the tire 2 stands on a road surface, the narrow land portion 60 easily moves toward the land portion body 58. The narrow land portion 60 can effectively suppress an excessive increase in ground-contact pressure at the outer end of the land portion body 58. In the tire 2, good uneven wear resistance is achieved. From this viewpoint, the height H1 in the radial direction of the inner recess portion 64 is preferably lower than the height H2 in the radial direction of the outer recess portion 66.

In the tire 2, from the viewpoint of being able to suppress concentration of strain on the groove bottom b of the narrow groove 56, the height H1 in the radial direction of the inner recess portion 64 is preferably not less than 1.0 mm and more preferably not less than 2.0 mm. From the viewpoint of ensuring stiffness of the land portion body 58, the height H1 in the radial direction of the inner recess portion 64 is preferably not greater than 4.0 mm.

In the tire 2, the ratio (H2/DS) of the height H2 in the radial direction of the outer recess portion 66 to the groove depth DS of the shoulder circumferential groove 24s is preferably not greater than 85%. Accordingly, the narrow land portion 60 can ensure required stiffness. The narrow land portion 60 can effectively suppress an excessive increase in ground-contact pressure at the outer end of the land portion body 58. From this viewpoint, the ratio (H2/DS) is more preferably not greater than 50%.

In the tire 2, from the viewpoint that the narrow land portion 60 can sufficiently exert its function, the groove depth D of the narrow groove 56 is preferably not less than 10 mm. From the same viewpoint, the ratio (D/DS) of the groove depth D of the narrow groove 56 to the groove depth DS of the shoulder circumferential groove 24s is preferably not less than 50%, more preferably not less than 60%, and further preferably not less than 70%. From the viewpoint of preventing chipping of the narrow land portion 60, the ratio (D/DS) is preferably not greater than 150%, more preferably not greater than 120%, and further preferably not greater than 100%.

In the tire 2, when the groove depth D of the narrow groove 56 is larger than the groove depth DS of the shoulder circumferential groove 24s, the ratio (H2/D) of the height H2 in the radial direction of the outer recess portion 66 to the groove depth D of the narrow groove 56 is preferably not greater than 50%. Accordingly, the narrow land portion 60 can ensure required stiffness. The narrow land portion 60 can effectively suppress an excessive increase in ground-contact pressure at the outer end of the land portion body 58. From this viewpoint, the ratio (H2/D) is more preferably not greater than 30%.

In the tire 2, when the groove depth D of the narrow groove 56 is equal to or smaller than the groove depth DS of the shoulder circumferential groove 24s, the ratio (H2/D) of the height H2 in the radial direction of the outer recess portion 66 to the groove depth D of the narrow groove 56 is preferably not greater than 70%. Accordingly, the narrow land portion 60 can ensure required stiffness. The narrow land portion 60 can effectively suppress an excessive increase in ground-contact pressure at the outer end of the land portion body 58. From this viewpoint, the ratio (H2/D) is more preferably not greater than 50% and further preferably not greater than 35%.

As described above, in the tire 2, the expansion portion 68 of the narrow groove 56 includes the inner recess portion 64 and the outer recess portion 66. The contour of the inner recess portion 64 includes the inner boundary portion 76, the inner curved portion 78, and the inner bottom portion 80. The contour of the outer recess portion 66 includes the outer boundary portion 82, the outer curved portion 84, and the outer bottom portion 86. As described above, the inner bottom portion 80 and the outer bottom portion 86 are represented by one circular arc. The contour of the expansion portion 68 is represented by a total of five circular arcs for the inner boundary portion 76, the inner curved portion 78, the bottom portion 88, the outer curved portion 84, and the outer boundary portion 82.

In the tire 2, the radius R2 of the inner curved portion 78 is preferably not less than 1.5 mm. Accordingly, the inner recess portion 64 can effectively contribute to distribution of strain generated at the groove bottom b. Since occurrence of damage at the groove bottom b is suppressed, the narrow land portion 60 can sufficiently exert its function. From this viewpoint, the radius R2 is more preferably not less than 3.0 mm. From the viewpoint that the land portion body 58 can ensure stiffness on the outer end side thereof, the radius R2 is preferably not greater than 10.0 mm, more preferably not greater than 7.0 mm, and further preferably not greater than 5.0 mm.

In the tire 2, the radius R3 of the bottom portion 88 is preferably not less than 1.0 mm. Accordingly, the bottom portion 88 can effectively contribute to distribution of strain generated at the groove bottom b. Since occurrence of damage at the groove bottom b is suppressed, the narrow land portion 60 can sufficiently exert its function. From this viewpoint, the radius R3 is more preferably not less than 1.5 mm. From the viewpoint that the groove width of the narrow groove 56 is appropriately maintained and the narrow land portion 60 can effectively support the land portion body 58, the radius R3 is preferably not greater than 7.0 mm, more preferably not greater than 5.0 mm, and further preferably not greater than 3.0 mm.

In the tire 2, the radius R1 of the inner boundary portion 76, the radius R4 of the outer curved portion 84, and the radius R5 of the outer boundary portion 82 are determined as appropriate in consideration of the above-described radius R2 of the inner curved portion 78 and the above-described radius R3 of the bottom portion 88. From the viewpoint of being able to contribute to improvement of uneven wear resistance, the radius R1 of the inner boundary portion 76 is preferably not less than 1.5 mm and not greater than 10.0 mm. The radius R4 of the outer curved portion 84 is preferably not less than 1.5 mm and not greater than 10.0 mm. The radius R5 of the outer boundary portion 82 is preferably not less than 1.5 mm and not greater than 10.0 mm.

In FIG. 4, a length indicated by reference sign Ga is the distance in the axial direction from the inner groove opening mu to the outer groove opening ms. The distance Ga in the axial direction is the groove width at the groove opening m of the narrow groove 56. A length indicated by reference sign Gb is the distance in the axial direction from the inner end in the axial direction of the expansion portion 68 to the outer end in the axial direction of the expansion portion 68. The distance Gb in the axial direction is the maximum width of the expansion portion 68.

In the tire 2, the groove width Ga at the groove opening m of the narrow groove 56 is preferably not less than 0.3 mm and not greater than 6.0 mm. When the groove width Ga is set to be not less than 0.3 mm, the narrow land portion 60 can come into contact with the land portion body 58 at an appropriate timing and sufficiently exert its function. When the groove width Ga is set to be not greater than 6.0 mm, the narrow land portion 60 can effectively support the land portion body 58 and sufficiently exert its function. From this viewpoint, the groove width Ga is preferably not greater than 3.0 mm.

In the tire 2, the ratio (Ga/Gb) of the groove width Ga at the groove opening m of the narrow groove 56 to the maximum width Gb of the expansion portion 68 is preferably not greater than 1.0. Accordingly, the narrow land portion 60 can effectively support the land portion body 58, so that the narrow land portion 60 can sufficiently exert its function. From this viewpoint, the ratio (Ga/Gb) is more preferably not greater than 0.6.

In FIG. 4, an alternate long and short dash line CL is a center line that represents the center in the width direction of the tubular portion 70 of the narrow groove 56. In the tire 2, the center line CL extends substantially in the radial direction. That is, the tubular portion 70 extends substantially in the radial direction. In the present disclosure, the tubular portion 70 extending substantially in the radial direction means that an angle of the center line CL relative to the radial direction is not greater than 5°.

In the tire 2, the groove bottom b of the narrow groove 56 is located outward of the center line CL of the tubular portion 70 in the axial direction. Accordingly, the inner groove opening mu side of the narrow groove 56, that is, the outer end side of the land portion body 58, is maintained with stiffness higher than that of the outer groove opening ms side of the narrow groove 56, that is, the inner end side of the narrow land portion 60. In the tire 2, occurrence of uneven wear is effectively suppressed. From this viewpoint, the groove bottom b of the narrow groove 56 is preferably located outward of the center line CL of the tubular portion 70 in the axial direction.

In FIG. 4, a length indicated by reference sign L1 is the depth in the axial direction of the inner recess portion 64. The depth L1 in the axial direction is the distance in the axial direction from the boundary between the inner smooth portion 72 and the inner boundary portion 76 to the inner end in the axial direction of the expansion portion 68 (in other words, the bottom of the inner recess portion 64). A length indicated by reference sign L2 is the depth in the axial direction of the outer recess portion 66. The depth L2 in the axial direction is the distance in the axial direction from the boundary between the outer smooth portion 74 and the outer boundary portion 82 to the outer end in the axial direction of the expansion portion 68 (in other words, the bottom of the outer recess portion 66). A length indicated by reference sign WD is the distance in the axial direction from the bottom of the outer recess portion 66 to the outer surface of the tire 2.

In the tire 2, from the viewpoint that the stiffness on the outer end side of the land portion body 58 and the stiffness on the inner end side of the narrow land portion 60 are well-balanced and the narrow groove 56 can effectively contribute to improvement of uneven wear resistance, the ratio (L1/L2) of the depth L1 in the axial direction of the inner recess portion 64 to the depth L2 in the axial direction of the outer recess portion 66 is preferably not less than 10% and preferably not greater than 35%. From the same viewpoint, the ratio (WD/Wg) of the distance WD in the axial direction from the bottom of the outer recess portion 66 to the outer surface of the tire 2 to the width Wg in the axial direction of the narrow land portion 60 is preferably not less than 1.0 and preferably not greater than 1.4.

As described above, the full band 42 has the ends 42e opposed to each other across the equator plane EL. The full band 42 extends in the axial direction from the equator plane EL toward each end 42e. Each end 42e of the full band 42 is located outward of the shoulder circumferential groove 24s in the axial direction. The full band 42 is located inward of the shoulder circumferential groove 24s in the radial direction.

In the tire 2, the full band 42 effectively suppresses deformation near the shoulder circumferential groove 24s.

Since a shape change of the tire 2 is suppressed, the ground-contact shape of the tire 2 is less likely to change. In the tire 2, occurrence of uneven wear is suppressed. From this viewpoint, each end 42e of the full band 42 is preferably located outward of the shoulder circumferential groove 24s in the axial direction.

In FIG. 3, a length indicated by reference sign SF is the distance in the axial direction from the shoulder circumferential groove 24s, in other words, the inner end of the shoulder land portion 54s, to the end 42e of the full band 42.

In the tire 2, the ratio (SF/WS) of the distance SF in the axial direction from the shoulder circumferential groove 24s to the end 42e of the full band 42, to the width WS in the axial direction of the shoulder land portion 54s, is preferably not greater than 50%. Accordingly, the end 42e of the full band 42 is located at an appropriate distance from the end of the tread 4 which moves actively in a running state. Since fluctuation of the tension of the band cord 46 is suppressed, occurrence of a break of the band cord 46 is suppressed in the tire 2. The full band 42 of the tire 2 contributes to suppression of a shape change. From this viewpoint, the ratio (SF/WS) is more preferably not greater than 35% and further preferably not greater than 25%.

The ratio (SF/WS) is preferably less than 10%. When the ratio (SF/WS) is set to be not less than 10%, the end 42e of the full band 42 is located at an appropriate distance from the shoulder circumferential groove 24s, specifically, the bottom of the shoulder circumferential groove 24s. In the tire 2, occurrence of damage starting from the bottom of the shoulder circumferential groove 24s is suppressed. Since the width of the full band 42 is ensured, the full band 42 contributes to suppression of a shape change of the tire 2. From this viewpoint, the ratio (SF/WS) is more preferably not less than 15%.

In FIG. 3, a length indicated by reference sign We is the distance in the axial direction from the end 42e of the full band 42 to the inner end 44ue of the edge band 44.

In the tire 2, the distance We in the axial direction from the end 42e of the full band 42 to the inner end 44ue of the edge band 44 is preferably not less than 10 mm. Accordingly, the edge band 44 effectively holds the end 42e of the full band 42. Fluctuation of the tension of the band cord 46 included in the full band 42 is suppressed, so that occurrence of a break of the band cord 46 due to the fluctuation of the tension is suppressed. The full band 42 of the tire 2 can more stably exhibit the function of suppressing a shape change. From this viewpoint, the distance We in the axial direction is more preferably not less than 20 mm.

In the tire 2, the position of the inner end 44ue of the edge band 44 is determined as appropriate in consideration of involvement in occurrence of damage starting from the bottom of the shoulder circumferential groove 24s. Therefore, a preferable upper limit of the distance We in the axial direction is not set. From the viewpoint of effectively suppressing occurrence of damage starting from the bottom of the shoulder circumferential groove 24s, in the axial direction, the inner end 44ue of the edge band 44 is preferably located outward of the bottom of the shoulder circumferential groove 24s, and more preferably located further outward of the shoulder circumferential groove 24s.

In the tire 2, each end 42e of the full band 42 is located inward of the end 32e of the belt 32 in the axial direction. The belt 32 is wider than the full band 42. The belt 32 holds each end 42e of the full band 42. The belt 32 contributes to suppression of fluctuation of the tension of the band cord 46 included in the full band 42. Occurrence of a break of the band cord 46 due to fluctuation of the tension is suppressed, so that the full band 42 can stably exhibit the function of suppressing a shape change. From this viewpoint, the end 42e of the full band 42 is preferably located inward of the end 32e of the belt 32 in the axial direction.

A force acts on the full band 42 of the tire 2 so as to spread from the inner side toward the outer side in the radial direction. Due to this force, tension is generated in the band cord 46 of the full band 42. In the tire 2, the second belt ply 36B is located radially inward of the full band 42.

In the tire 2, the second belt ply 36B reduces the force acting on the full band 42, so that the tension of the band cord 46 included in the full band 42 is appropriately maintained. The second belt ply 36B contributes to suppression of fluctuation of the tension of the band cord 46. Since the second belt ply 36B is wider than the full band 42, fluctuation of the tension of the band cord 46 is effectively suppressed. In the tire 2, a break is less likely to occur in the band cord 46 of the full band 42. The full band 42 can stably exhibit the function of suppressing a shape change. From this viewpoint, at least one belt ply 36 of the plurality of belt plies 36 included in the belt 32 is preferably located inward of the full band 42 in the radial direction. The at least one belt ply 36 located inward of the full band 42 more preferably has a width larger than the width of the full band 42.

In the tire 2, the first belt ply 36A and the second belt ply 36B are located inward of the full band 42 in the radial direction. The first belt ply 36A and the second belt ply 36B contribute to suppression of fluctuation of the tension of the band cord 46. Since the first belt ply 36A and the second belt ply 36B are wider than the full band 42, fluctuation of the tension of the band cord 46 is more effectively suppressed. In the tire 2, a break is less likely to occur in the band cord 46 of the full band 42. The full band 42 can stably exhibit the function of suppressing a shape change. From this viewpoint, at least two belt plies 36 of the plurality of belt plies 36 included in the belt 32 are more preferably located inward of the full band 42 in the radial direction. The at least two belt plies 36 located inward of the full band 42 further preferably have a width larger than the width of the full band 42.

In the tire 2, in the radial direction, the second belt ply 36B is located inward of the full band 42, and the third belt ply 36C is located outward of the full band 42. In the tire 2, the full band 42 is interposed between the second belt ply 36B and the third belt ply 36C. As described above, the second belt ply 36B is wider than the full band 42. The third belt ply 36C is also wider than the full band 42. The plurality of belt plies 36 included in the belt 32 of the tire 2 include two belt plies 36 having a width larger than the width of the full band 42, and the full band 42 is interposed between the two belt plies 36 having a large width. In the tire 2, fluctuation of the tension of the band cord 46 included in the full band 42 is more effectively suppressed, so that a break is less likely to occur in the band cord 46 of the full band 42. The full band 42 of the tire 2 can stably exhibit the function of suppressing a shape change. From this viewpoint, in the tire 2, preferably, the plurality of belt plies 36 included in the belt 32 include two belt plies 36 having a width larger than the width of the full band 42, and the full band 42 is interposed between the two belt plies 36 having a large width.

In the tire 2, the first belt ply 36A, the second belt ply 36B, and the third belt ply 36C have a width larger than the width of the full band 42. In the radial direction, the first belt ply 36A and the second belt ply 36B are located inward of the full band 42, and the third belt ply 36C is located outward of the full band 42. The pair of edge bands 44 are located outward of the third belt ply 36C in the radial direction. As described above, each edge band 44 is located outward of the end 42e of the full band 42 in the radial direction. The edge band 44 overlaps the end 42e of the full band 42 via the third belt ply 36C in the radial direction.

In the tire 2, the full band 42 can stably exhibit the function of suppressing a shape change, and improvement of uneven wear resistance is achieved. From this viewpoint, preferably, in the tire 2, the plurality of belt plies 36 included in the belt 32 include the first belt ply 36A located on the inner side in the radial direction, the second belt ply 36B located outward of the first belt ply 36A in the radial direction, and the third belt ply 36C located outward of the second belt ply 36B in the radial direction, the first belt ply 36A, the second belt ply 36B, and the third belt ply 36C have a width larger than the width of the full band 42, the first belt ply 36A and the second belt ply 36B are located inward of the full band 42 in the radial direction, the third belt ply 36C is located outward of the full band 42 in the radial direction, and each edge band 44 located outward of the full band 42 overlaps the end 42e of the full band 42 via the third belt ply 36C in the radial direction.

In the tire 2, the ratio (WT/WA) of the width WT of the tread 4 to the cross-sectional width WA is preferably not less than 0.60 and not greater than 0.90. When the ratio (WT/WA) is set to be not less than 0.60, the internal volume of the tire 2 is appropriately maintained. The band 34 effectively suppresses radial growth of the tire 2. Since the ground-contact shape of the tire 2 is less likely to change, good uneven wear resistance is achieved in the tire 2. From this viewpoint, the ratio (WT/WA) is more preferably not less than 0.75. When the ratio (WT/WA) is set to be not greater than 0.90, the holding force of the band 34 is appropriately maintained. Since damage caused due to concentration of strain on the sidewall 6 is prevented, the tire 2 has good durability. From this viewpoint, the ratio (WT/WA) is more preferably not greater than 0.85.

As is obvious from the above description, in the tire 2, the band 34 and the narrow groove 56 formed at the end portion of the shoulder land portion 54s effectively contribute to improvement of uneven wear resistance. Since the inner recess portion 64 and the outer recess portion 66, which are provided on the groove bottom b side of the narrow groove 56, suppress occurrence of damage at the groove bottom b, good uneven wear resistance of the tire 2 is maintained over a long period of time. According to the present invention, the heavy duty tire 2 that can achieve improvement of uneven wear resistance is obtained. The present invention exhibits a remarkable effect in the low-flatness heavy duty tire 2 having a nominal aspect ratio of 65% or less.

EXAMPLES

The following will describe the present invention in further detail by means of examples, etc., but the present invention is not limited to the examples.

Example 1

A heavy duty pneumatic tire (tire size=355/50R22.5) having the basic structure shown in FIG. 1 to FIG. 4 and having specifications shown in Table 1 below was obtained.

The reinforcing layer of Example 1 includes a band including a spirally wound band cord, in addition to a belt. This is represented as "Y" in the cell for "band" in Table 1 below.

In Example 1, each end of the full band was located outward of the shoulder circumferential groove in the axial direction. The distance We in the axial direction from the end of the full band to the inner end of the edge band was 25 mm. The ratio (SF/WS) of the distance SF in the axial direction from the shoulder circumferential groove to the end of the full band, to the width WS in the axial direction of the shoulder land portion, was 15%.

In Example 1, the height H1 in the radial direction of the inner recess portion was 3.0 mm. The height H2 in the radial direction of the outer recess portion was 5.0 mm. The radius R2 of the inner curved portion included in the inner recess portion was 1.5 mm. The ratio (D/DS) of the groove depth D of the narrow groove to the groove depth DS of the shoulder circumferential groove was 75%. The ratio (Ga/Gb) of the groove width Ga at the groove opening of the narrow groove to the maximum width Gb of the expansion portion was 0.4. The ratio (WT/WA) of the width WT of the tread to the cross-sectional width WA was 0.75. The groove depth DS of the shoulder circumferential groove was 19.0 mm.

Comparative Example 1

A tire of Comparative Example 1 was obtained in the same manner as Example 1, except that the reinforcing layer was formed by only a belt and a narrow groove was not provided thereon. The fact that the reinforcing layer does not include a band is represented as "N" in the cell for "band" in Table 1 below.

Comparative Example 2

A tire of Comparative Example 2 was obtained in the same manner as Example 1, except that a narrow groove was not provided.

Comparative Example 3

A tire of Comparative Example 3 was obtained in the same manner as Example 1, except that an inner recess portion and an outer recess portion were not provided on the groove bottom side of the narrow groove. The narrow groove was formed so as to have a uniform groove width from the groove opening toward the groove bottom. This is represented as "1.0" in the cell for "Ga/Gb" in Table 1 below.

Example 2

A tire of Example 2 was obtained in the same manner as Example 1, except that the height H1 in the radial direction was set as shown in Table 1 below.

Examples 3 and 4

Tires of Examples 3 and 4 were obtained in the same manner as Example 1, except that the height H2 in the radial direction was set as shown in Table 1 below.

Example 5

A tire of Example 5 was obtained in the same manner as Example 1, except that the radius R2 was set as shown in Table 2 below.

Examples 6 and 7

Tires of Examples 6 and 7 were obtained in the same manner as Example 1, except that the groove depth D of the narrow groove was changed such that the ratio (D/DS) was set as shown in Table 2 below.

Examples 8 and 9

Tires of Examples 8 and 9 were obtained in the same manner as Example 1, except that the ratio (Ga/Gb) was set as shown in Table 2 below.

[Uneven Wear Resistance]

A test tire was fitted onto a rim (11.75×22.5) and inflated with air to adjust the internal pressure of the tire to a normal internal pressure. The tire was mounted to a drive shaft of a test vehicle (tractor head). A trailer loaded with luggage was towed by the test vehicle, and the test vehicle was caused to run on a test course having an asphalt road surface. After running for 20,000 km, a wear amount Ce of the center land portion and a wear amount Sh of the shoulder land portion were obtained, and the ratio (Sh/Ce) of the wear amount Sh to the wear amount Ce was obtained. The results are represented in Tables 1 and 2 below. The closer the value is to 1.0, the better the uneven wear resistance of the tire is.

[Damage of Narrow Groove (Groove Bottom Crack Resistance)]

After the evaluation of uneven wear resistance, the damage state of the narrow groove was visually confirmed, and the lengths of the cracks were measured. The results are represented in Tables 1 and 2 below as indexes with the result of Example 1 being regarded as 100. The lower the value is, the more the occurrence of groove bottom cracks is suppressed. In this evaluation, if the index is 120 or lower, it is determined that the occurrence of groove bottom cracks is suppressed, and the groove bottom crack resistance is acceptable.

TABLE 1

|  | Comp. Ex. 1 | Comp. Ex. 2 | Comp. Ex. 3 | Ex. 2 | Ex. 1 | Ex. 3 | Ex. 4 |
| --- | --- | --- | --- | --- | --- | --- | --- |
| Band | N | Y | Y | Y | Y | Y | Y |
| H1 [mm] | — | — | — | 5.0 | 3.0 | 3.0 | 3.0 |
| H2 [mm] | — | — | — | 5.0 | 5.0 | 9.5 | 11.4 |
| R2 [mm] | — | — | — | 1.5 | 1.5 | 1.5 | 1.5 |
| D/DS [%] | — | — | 75 | 75 | 75 | 75 | 75 |
| Ga/Gb [—] | — | — | 1.0 | 0.4 | 0.4 | 0.4 | 0.4 |
| Uneven wear resistance | 1.8 | 1.5 | 1.3 | 1.2 | 1.2 | 1.2 | 1.2 |
| Groove bottom crack resistance | — | — | 150 | 120 | 100 | 110 | 120 |

TABLE 2

|  | Ex. 5 | Ex. 6 | Ex. 7 | Ex. 8 | Ex. 9 |
| --- | --- | --- | --- | --- | --- |
| Band | Y | Y | Y | Y | Y |
| H1 [mm] | 3.0 | 3.0 | 3.0 | 3.0 | 3.0 |
| H2 [mm] | 5.0 | 5.0 | 5.0 | 5.0 | 5.0 |
| R2 [mm] | 3.0 | 1.5 | 1.5 | 1.5 | 1.5 |
| D/DS [%] | 75 | 100 | 120 | 75 | 75 |
| Ga/Gb [—] | 0.4 | 0.4 | 0.4 | 0.6 | 0.9 |
| Uneven wear resistance | 1.2 | 1.2 | 1.2 | 1.2 | 1.2 |
| Groove bottom crack resistance | 80 | 100 | 120 | 110 | 120 |

As shown in Tables 1 and 2, in the Examples, occurrence of cracks at the groove bottom is suppressed, and improvement of uneven wear resistance is achieved. From the evaluation results, advantages of the present invention are clear.

INDUSTRIAL APPLICABILITY

The above-described technology for achieving improvement of uneven wear resistance can be applied to various tires.

REFERENCE SIGNS LIST 2 tire
4 tread
20 reinforcing layer
22 tread surface
24, 24s, 24m circumferential groove
32 belt
34 band
36 belt ply
38 belt cord
42 full band
42e end of full band 42
44 edge band
44se outer end of edge band 44
44ue inner end of edge band 44
46 band cord
54, 54s, 54m, 54c land portion
56 narrow groove
58 land portion body
60 narrow land portion
62, 62u, 62s groove wall
64 inner recess portion
66 outer recess portion

The invention claimed is:

1. A heavy duty tire having a nominal aspect ratio of 65% or less and comprising a tread that comes into contact with a road surface and a band that is located inward of the tread in a radial direction and that includes a spirally wound band cord, wherein
at least three circumferential grooves are formed on the tread, whereby at least four land portions are formed in the tread,
among the at least three circumferential grooves, a circumferential groove located on each outer side in an axial direction is a shoulder circumferential groove,
a land portion located outward of the shoulder circumferential groove in the axial direction is a shoulder land portion,
the band includes a full band having ends opposed to each other across an equator plane, and a pair of edge bands located outward of the ends of the full band in the radial direction,
a narrow groove is formed on the shoulder land portion so as to extend in a circumferential direction,
the narrow groove includes an inner groove wall that is located on an equator plane side and that connects a groove opening and a groove bottom of the narrow groove, and an outer groove wall that is located outward of the inner groove wall in the axial direction and that connects the groove opening and the groove bottom of the narrow groove,
the inner groove wall includes an inner recess portion that is recessed inward in the axial direction, on the groove bottom side,
the outer groove wall includes an outer recess portion that is recessed outward in the axial direction, on the groove bottom side,
the narrow groove includes an expansion portion defined by the inner recess portion and the outer recess portion, a ratio of a groove width at the groove opening of the narrow groove to a maximum width of the expansion portion is not greater than 1.0, the narrow groove includes a tubular portion that connects the groove opening and the expansion portion and that extends straight, and the groove bottom is located outward of a center line of the tubular portion in the axial direction, and a height in the radial direction of the inner recess portion is lower than a height in the radial direction of the outer recess portion.

2. The heavy duty tire according to claim 1, wherein a contour of the inner recess portion in a meridional cross-section of the tire includes an inner curved portion represented by a circular arc having a center on an outer side of the inner recess portion in the axial direction, and the circular arc has a radius of not less than 1.5 mm.

3. The heavy duty tire according to claim 1, wherein a ratio of a groove depth of the narrow groove to a groove depth of the shoulder circumferential groove is not greater than 150%.

4. The heavy duty tire according to claim 1, wherein each end of the full band is located outward of the shoulder circumferential groove in the axial direction.

5. The heavy duty tire according to claim 1, wherein a ratio of a distance in the axial direction from the shoulder circumferential groove to the end of the full band, to a width in the axial direction of the shoulder land portion, is not less than 10% and not greater than 50%.

6. The heavy duty tire according to claim 1, wherein a distance in the axial direction from the end of the full band to an inner end of the edge band is not less than 10 mm.

7. The heavy duty tire according to claim 1, wherein a ratio of a width of the tread to a cross-sectional width of the tire is not less than 0.60 and not greater than 0.90.

8. The heavy duty tire according to claim 1, comprising a belt that includes a large number of belt cords aligned with each other, the belt includes a plurality of belt plies aligned in the radial direction, and the end of the full band is located inward of an end of the belt in the axial direction.

9. The heavy duty tire according to claim 8, wherein at least one belt ply of the plurality of belt plies is located inward of the full band in the radial direction.

10. The heavy duty tire according to claim 8, wherein at least two belt plies of the plurality of belt plies are located inward of the full band in the radial direction.

11. The heavy duty tire according to claim 8, wherein the plurality of belt plies include two belt plies having a width larger than the width of the full band, and the full band is interposed between the two belt plies having a large width.

12. The heavy duty tire according to claim 8, wherein the plurality of belt plies include a first belt ply, a second belt ply located outward of the first belt ply in the radial direction, and a third belt ply located outward of the second belt ply in the radial direction, the first belt ply, the second belt ply, and the third belt ply have a width larger than the width of the full band, the first belt ply and the second belt ply are located inward of the full band in the radial direction, the third belt ply is located outward of the full band in the radial direction, and the edge band overlaps the end of the full band via the third belt ply in the radial direction.

13. The heavy duty tire according to claim 1, wherein each edge band has an outer end located outward of the shoulder circumferential groove in the axial direction.

14. The heavy duty tire according to claim 13, wherein each edge band has an inner end located outward of the shoulder circumferential groove in the axial direction.

* * * * *